(12) United States Patent
Zarowny et al.

(10) Patent No.: US 7,720,618 B2
(45) Date of Patent: May 18, 2010

(54) METHOD FOR MONITORING FLUID LEVELS IN A TANK

(75) Inventors: Cam Zarowny, Streamstown (CA); Wayne Muir, Lloydminster (CA); Wendell Young, Cochrane (CA)

(73) Assignee: Noralta Technologies Inc., Lloydminster (CA)

( * ) Notice: Subject to any disclaimer, the term of this patent is extended or adjusted under 35 U.S.C. 154(b) by 161 days.

(21) Appl. No.: 11/944,376

(22) Filed: Nov. 21, 2007

(65) Prior Publication Data

US 2008/0125983 A1    May 29, 2008

(51) Int. Cl.
*G01N 11/00* (2006.01)
(52) U.S. Cl. .................. 702/55; 702/136
(58) Field of Classification Search ............ 702/55, 702/136
See application file for complete search history.

(56) References Cited

U.S. PATENT DOCUMENTS

| | | | |
|---|---|---|---|
| 2,468,676 A | 4/1949 | Liben | |
| 2,741,126 A * | 4/1956 | Anderson et al. | 374/137 |
| 3,111,031 A | 11/1963 | Kuritza | |
| 3,600,946 A | 8/1971 | Ziemba | |
| 4,123,160 A * | 10/1978 | Caputo et al. | 356/301 |
| 4,805,454 A | 2/1989 | LeVert | |
| 4,929,930 A | 5/1990 | Rezabek | |
| 5,228,340 A | 7/1993 | Kataoka | |
| 5,748,317 A | 5/1998 | Maris | |
| 6,098,457 A | 8/2000 | Poole | |
| 6,434,495 B1 * | 8/2002 | Kitamura et al. | 702/50 |
| 6,613,720 B1 * | 9/2003 | Feraud et al. | 507/200 |
| 6,761,066 B2 | 7/2004 | Rait | |
| 6,862,932 B2 | 3/2005 | Zimmermann | |
| 6,959,599 B2 | 11/2005 | Feldstein | |
| 2005/0250860 A1 * | 11/2005 | Appleford et al. | 516/135 |

* cited by examiner

*Primary Examiner*—Bryan Bui
*Assistant Examiner*—Jonathan Teixeira Moffat
(74) *Attorney, Agent, or Firm*—Christensen O'Connor Johnson Kindness PLLC

(57) ABSTRACT

A method for monitoring fluid levels in a tank. A first step involves modelling the tank to identify fluid zones of fluids having differing densities, the heat retention characteristics of each the fluid zones and the relative relationships between each of the fluid zones. A second step involves obtaining a heat profile of the tank. A third step involves analyzing the heat profile based upon the modelling to generate relative fluid level data for the tank.

10 Claims, 1 Drawing Sheet

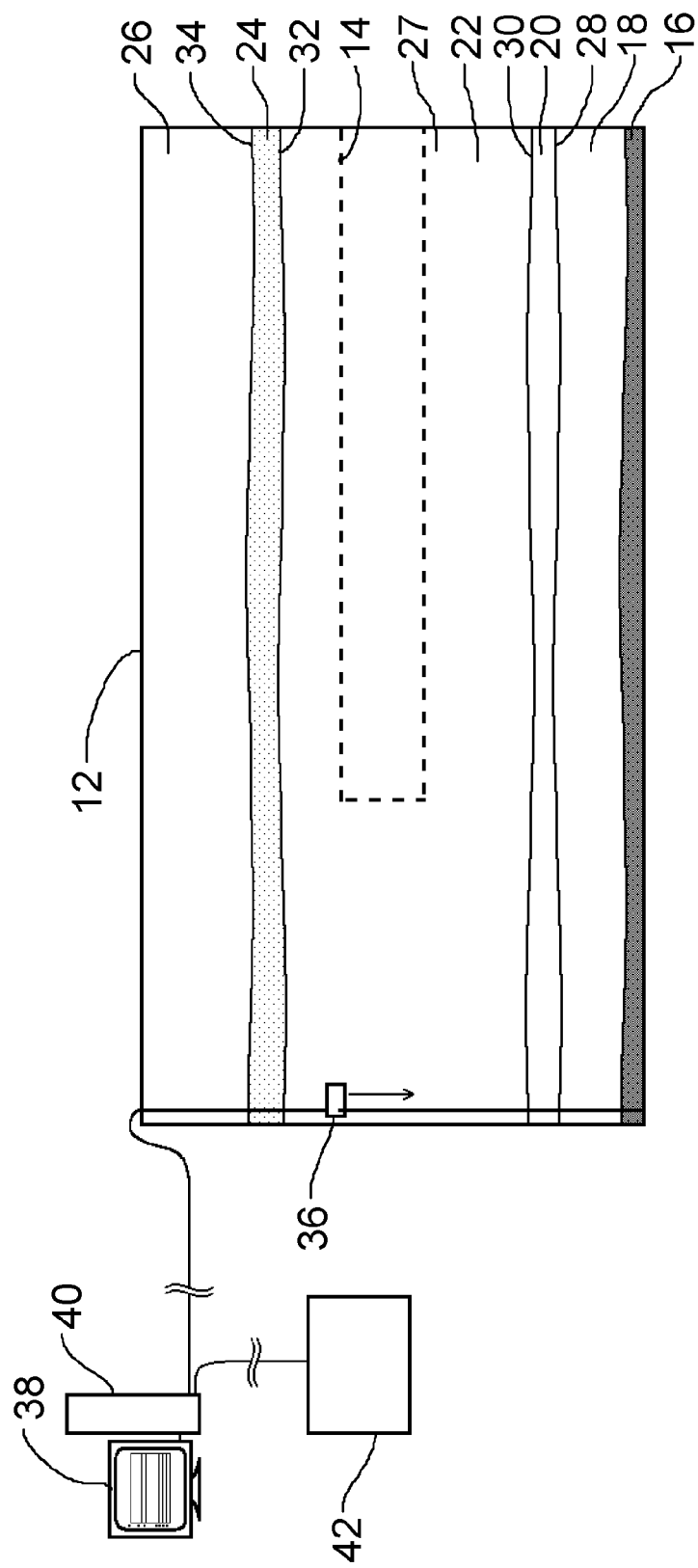
THE FIGURE

METHOD FOR MONITORING FLUID LEVELS IN A TANK

FIELD

This application claims priority under 35 U.S.C. §119 to Canadian Patent Application No. 2,568,940, filed Nov. 24, 2006, all of which is incorporated by reference herein. The present application relates to a method of monitoring fluid levels in a tank based upon differential rates of heat transfer.

BACKGROUND

Production from an oil well is pumped from the oil well into a production tank. Each production tank may, and usually does, contain varying amounts of six substances: sand, oil, water, oil/water emulsion, foam, and gas. If there is an excessive quantity of any one of these substances, remedial action should be taken. Knowing the over all fluid level in the production tank is not sufficient, as it does not indicate the relative quantities of the substances.

U.S. Pat. No. 6,959,599 (Feldstein et al.) entitled "Level detector for storage tanks for fluids", discloses a level detector which can detect the difference between a mass of fluid and the void volume above it. The Feldstein et al. level detector operates upon a theory of differential rate of heat transfer. This Feldstein et al. level detector would be effective to indicate total fluid volume, but would not be effective, by itself, in determining the relative quantities of the substances. With oil well production tanks the analysis is further complicated by the presence of a fire tube, which heats the fluids to promote separation and, in doing so, maintains the fluids within a relatively homogeneous temperature profile.

SUMMARY

There is provided a method for monitoring fluid levels in a tank. A first step involves modelling the tank to identify fluid zones of fluids having differing densities, the heat retention characteristics of each the fluid zones and the relative relationships between each of the fluid zones. A second step involves obtaining a heat profile of the tank. A third step involves analyzing the heat profile based upon the modelling to generate relative fluid level data for the tank.

BRIEF DESCRIPTION OF THE DRAWINGS

These and other features will become more apparent from the following description in which reference is made to the appended drawings, the drawings are for the purpose of illustration only and are not intended to be in any way limiting, wherein:

THE FIGURE is a schematic view of an oil well production tank with monitoring and control equipment.

DETAILED DESCRIPTION

A method for monitoring oil well production tanks having a fire tube heater will now be described with reference to THE FIGURE.

Broadly stated, the method involves modelling a tank to identify fluid zones of fluids having differing densities, the heat retention characteristics of each the fluid zones and the relative relationships between each of the fluid zones. A heat profile of the tank is obtained. The heat profile is then analyzed based upon the modelling to generate relative fluid level data for the tank. The method will now be described in detail with respect to an oil well production tank. Once the teachings of the method are understood, it will be appreciated that the method can be applied to other forms of tanks containing other fluids.

Referring to THE FIGURE, the method for monitoring an oil well production tank 12 that has a fire tube heater 14 begins by modelling oil well production tank 12 in order to generate relative fluid level data based on a heat profile. The tank is modelled to have the following fluid zones, consecutively from bottom to top: a sand zone 16, a water zone 18, an oil/water emulsion zone 20, an oil zone 22, a foam zone 24, and a gas zone 26. Fire tube heater 14 is submerged in oil zone 22, and corresponds to an area 27 of greatest heat. Because of the position of fire tube heater 14, oil zone 22 will have a temperature that is slightly above the temperature of water zone 18, while sand zone 16 will absorb relatively little heat. Oil/water emulsion zone 20 is characterized by a temperature inversion, with an interface 28 between water zone 18 and oil/water emulsion zone 20 that reflects the temperature of oil zone 22, and an interface 30 between oil zone 22 and oil/water emulsion zone 20 that reflects the temperature of water zone 18. Foam zone 24 is also characterized by a temperature inversion with an interface 32 between foam zone 24 and oil zone 22 reflecting the temperature of gas zone 26 and an interface 34 between foam zone 24 and gas zone 26 reflecting the temperature of oil zone 22. Once the model has been created, the heat profile of the oil well production tank 12 is obtained to be used in the model. The heat profile may be obtained by a movable heat detector 36 that traverses oil well production tank 12, as depicted. However, the heat profile may also be determined by other means that will be recognized by those skilled in the art, such as by using a fixed heat detector mounted to oil well production tank 12, or by aiming a remote directional heat detector, commonly known as a "heat gun", at the oil well production tank. The heat profile gives an approximation of how the temperature changes as one progresses through the tank. Then, using the model and the assumptions built into it, the heat profile is then able to generate relative fluid level data for oil well production tank 12, for each of the zones.

Once relative fluid level data has been obtained, it may be used in a number of ways. For example, the fluid level data may be shown graphically in the form of a map of the oil well production tank on a monitor 38. The map is generated by a computer 40 based upon the heat profile and an algorithm incorporating the model and its assumptions. The fluid level data may also be related to and used by a controller 42 which operates equipment based upon the fluid level data. Controller 42 may be programmed to perform certain functions, such as decreasing chemical injections by chemical injection equipment, such as if the oil/water emulsion zone gets above a preset plateau level. Controller 42 may also shut down a pump that pumps fluids to the production tank, such as if the foam zone gets above a preset level, or it may send an electronic signal to a central monitoring facility if, for example, the sand zone or the water zone gets above a preset level.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope defined in the Claims.

What is claimed is:

1. A method for monitoring an oil well production tank having a fire tube heater, comprising the steps of:
modelling, using a computer, the oil well production tank, such that:
the tank has fluid zones, the fluid zones comprising, consecutively from bottom to top: a sand zone, a water zone, an oil/water emulsion zone, an oil zone, a foam zone, and a gas zone;
the oil zone has a temperature slightly above a temperature of the water zone;
the oil/water emulsion zone is characterized by a temperature inversion with an interface between the water zone and the oil/water emulsion zone reflecting the temperature of the oil zone and an interface between the oil zone and the oil/water emulsion zone reflecting the temperature of the water zone,
the sand zone absorbs relatively little heat;
the foam zone is characterized by a temperature inversion with an interface between the foam zone and the oil zone reflecting the temperature of the gas zone and an interface between the foam zone and the gas zone reflecting the temperature of the oil zone; and
a fire tube heater is submerged in the oil zone and corresponds to an area of greatest heat;
obtaining a heat profile of the oil well production tank; and
analyzing, using a computer, the heat profile using the modelling to generate relative fluid level data for the oil well production tank or a selected portion of the tank.

2. The method of claim 1, the heat profile being obtained by a movable heat detector that traverses the oil well production tank.

3. The method of claim 1, the heat profile being obtained by a fixed heat detector mounted to the oil well production tank.

4. The method of claim 1, the heat profile being obtained by aiming a remote directional heat detector at the oil well production tank.

5. The method of claim 1, the fluid level data being shown graphically in the form of a map of the oil well production tank, the map being generated by a computer based upon the heat profile and an algorithm incorporating the model.

6. The method of claim 1, the fluid level data being related to a controller which operates equipment based upon the fluid level data.

7. The method of claim 6, the controller decreasing chemical injections by chemical injection equipment if the oil/water emulsion zone gets above a preset plateau level.

8. The method of claim 6, the controller shutting down a pump pumping fluids to the production tank, if the foam zone gets above a preset level.

9. The method of claim 6, the controller sending an electronic signal to a central monitoring facility if the sand zone gets above a preset level.

10. The method of claim 6, the controller sending an electronic signal to a central monitoring facility if the water zone gets above a preset level.

* * * * *

UNITED STATES PATENT AND TRADEMARK OFFICE
CERTIFICATE OF CORRECTION

| | |
|---|---|
| PATENT NO. | : 7,720,618 B2 |
| APPLICATION NO. | : 11/944376 |
| DATED | : May 18, 2010 |
| INVENTOR(S) | : C. Zaroway et al. |

Page 1 of 1

It is certified that error appears in the above-identified patent and that said Letters Patent is hereby corrected as shown below:

On the Title Page:
insert

Item -- (30)    Foreign Application Priority Data

Nov. 24, 2006   Canada   2568940 --

Signed and Sealed this

Seventeenth Day of August, 2010

David J. Kappos
*Director of the United States Patent and Trademark Office*